(12) United States Patent
Arcella et al.

(10) Patent No.: US 7,399,791 B2
(45) Date of Patent: Jul. 15, 2008

(54) FLUORINATED MEMBRANES

(75) Inventors: Vincenzo Arcella, Milan (IT); Fabio Polastri, Milan (IT); Alessandro Ghielmi, Milan (IT); Paola Vaccarono, Milan (IT)

(73) Assignee: Solvay Solexis S.p.A., Milan (IT)

( * ) Notice: Subject to any disclaimer, the term of this patent is extended or adjusted under 35 U.S.C. 154(b) by 326 days.

(21) Appl. No.: 11/110,745

(22) Filed: Apr. 21, 2005

(65) Prior Publication Data

US 2005/0239912 A1 Oct. 27, 2005

(30) Foreign Application Priority Data

Apr. 22, 2004 (IT) .................... MI2004A0789

(51) Int. Cl.
*C08J 5/20* (2006.01)
(52) U.S. Cl. .................... 521/27; 429/35; 526/243; 526/247
(58) Field of Classification Search .................... 521/27; 429/35; 526/243, 247
See application file for complete search history.

(56) References Cited

U.S. PATENT DOCUMENTS

| | | | |
|---|---|---|---|
| 2,242,218 A | | 5/1941 | Auer |
| 3,041,317 A | * | 6/1962 | Gibbs et al. .................... 526/243 |
| 3,665,041 A | | 5/1972 | Sianesi et al. |
| 3,715,378 A | | 2/1973 | Sianesi et al. |
| 3,810,874 A | | 5/1974 | Mitsch et al. |
| 4,035,565 A | | 7/1977 | Apotheker et al. |
| 4,243,770 A | | 1/1981 | Tatemoto et al. |
| 4,358,545 A | * | 11/1982 | Ezzell et al. .................... 521/27 |
| 4,487,668 A | * | 12/1984 | England et al. ............. 205/520 |
| 4,552,631 A | * | 11/1985 | Bissot et al. ................. 205/521 |
| 4,564,662 A | | 1/1986 | Albin |
| 4,650,551 A | | 3/1987 | Carl et al. |
| 4,694,045 A | | 9/1987 | Moore |
| 4,745,165 A | | 5/1988 | Arcella et al. |
| 4,940,525 A | * | 7/1990 | Ezzell et al. ................. 204/252 |
| 4,943,622 A | | 7/1990 | Naraki et al. |

(Continued)

FOREIGN PATENT DOCUMENTS

EP 0 136 596 A2 4/1985

(Continued)

OTHER PUBLICATIONS

European Search Report, EP 05 00 8147.

(Continued)

*Primary Examiner*—Peter D. Mulcahy
*Assistant Examiner*—Henry Hu
(74) *Attorney, Agent, or Firm*—Arent Fox LLP

(57) ABSTRACT

Ionomeric membranes comprising (per)fluorinated, se-micrystalline or amorphous, ionomeric polymers, having equivalent weight (EW) from 380 g/eq to 1,800 g/eq, which used in fuel cells, under the following conditions:

Figure 1:
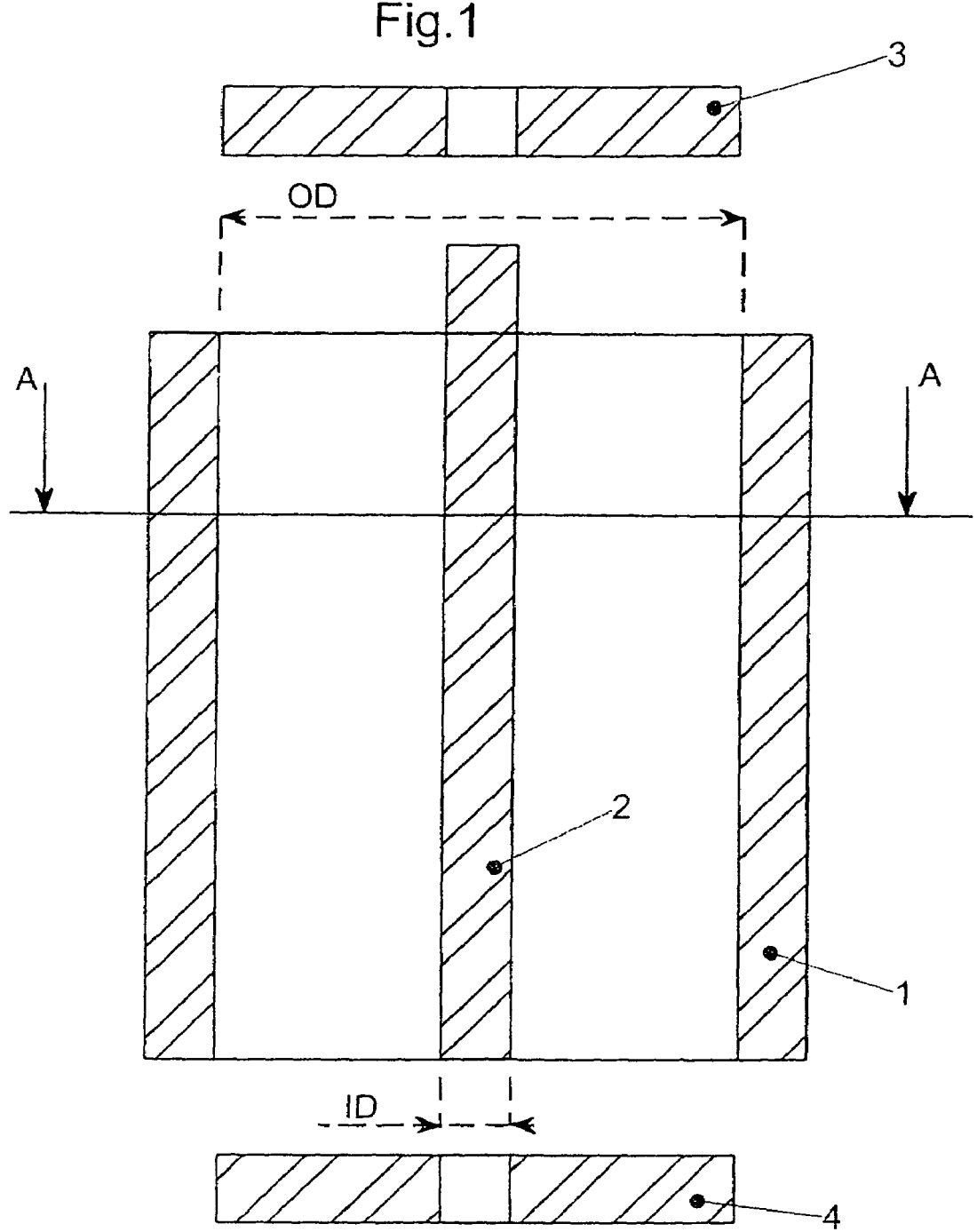

membrane thickness 50 μm assembled between two electrodes catalyzed with 0.6 mg/cm² Pt/C and treated with 0.7 mg/cm² of Nafion®, having a 10 cm² area; hydrogen and air feeding, both at the pressure of 0.25 MPa, both saturated with water at 80° C.; cell temperature 75° C.; for membranes formed of copolymers TFE/$F_2C=CF-O-(CF_2)_2-SO_2F$, give the following maximum specific power ($P_{MAX}$) values, at the indicated EW values:

at EW=670 $P_{MAX}$ higher than 0.55 Watt/cm²;
at EW=830 $P_{MAX}$ higher than 0.66 Watt/cm²;
at EW=1,160 $P_{MAX}$ higher than 0.50 Watt/cm²;
at EW=1,600 $P_{MAX}$ higher than 0.32 Watt/cm².

23 Claims, 2 Drawing Sheets

U.S. PATENT DOCUMENTS

| | | | |
|---|---|---|---|
| 5,173,553 A | | 12/1992 | Albano et al. |
| 5,458,955 A | | 10/1995 | Vaughn et al. |
| 5,928,792 A | * | 7/1999 | Moya .................. 428/422 |
| 6,080,501 A | * | 6/2000 | Kelley et al. ............ 429/31 |
| 6,130,175 A | * | 10/2000 | Rusch et al. ............ 442/77 |
| 6,248,469 B1 | * | 6/2001 | Formato et al. .......... 429/41 |
| 2003/0146148 A1 | * | 8/2003 | Wu et al. ............... 210/483 |

FOREIGN PATENT DOCUMENTS

| | | |
|---|---|---|
| EP | 0 148 482 A2 | 7/1985 |
| EP | 0 199 138 B1 | 10/1986 |
| EP | 0 239 123 A2 | 9/1987 |
| EP | 0 410 351 A1 | 1/1991 |
| EP | 0 661 304 B1 | 7/1995 |
| EP | 1 167 400 A1 | 1/2002 |
| EP | 1 238 999 A1 | 9/2002 |
| EP | 1 239 000 A1 | 9/2002 |
| EP | 1 323 744 A1 | 7/2003 |
| EP | 1589062 A2 * | 10/2005 |
| WO | WO 03/050150 A1 | 6/2003 |
| WO | WO 03/105263 A2 | 12/2003 |

OTHER PUBLICATIONS

European Search Report, EP 05 008147, Aug. 16, 2005.

* cited by examiner

FLUORINATED MEMBRANES

The present invention relates to membranes comprising semicrystalline or amorphous ionomeric (per)fluorinated-polymers, usable in electrochemical applications, for example fuel cells, electrochemical cells or electrolyzers, for example for hydrochloric acid.

Specifically, the invention relates to ionomer membranes having also very thin thickness, up to 5 μm and having an improved solvation degree, good mechanical properties under the use conditions, combined with an improved conductivity.

It is known in th e prior art to use ionomeric polymers, for example pertfluorosulphonic and/or perfluorocarboxylic in electrochemical applications, as in fuel cells, electrochemical cells for example chloro-soda cells, electrolyzers for HCl, energy accumulation systems using fuel cells (regenerative fuel cell. technology), lithium batteries, electrodialysis. In these applications the ionomer is in contact with a liquid, having affinity with the ionic functional groups of the ionomer, selected from aqueous or organic polar solvents. The membranes used according to the prior art are generally obtained by melt extrusion.

It is known in the prior art that in electrochemical applications it is desirable to have membranes having the following combination of properties: good ionic conductivity and good mechanical properties. Furthermore it is known to use ionomeric membranes having very thin thickness, since by decreasing the thickness, the resistance to the membrane ionic transport decreases. These membranes with a reduced thickness better resist to the critical dehydration conditions, taking place for example in fuel cells when the cell works at high temperature, for example at a temperature higher than 100° C. Another factor affecting the ionic transport is the water retention by the membrane. In fact it is known that, by increasing the hydration degree, the conductivity increases being equal the amount of ionic groups of the membrane.

To improve the membrane mechanical properties it is known to use high equivalent weight (EW) ionomers. However these polymers have the drawback to have an unsatisfactory hydration, and therefore their ionic conductivity is not high.

Summing up, the ionomeric membranes described in the prior art do not show the desired combination of good mechanical properties and good ionic conductivity.

It is therefore desirable to have available membranes having, also when used at high temperatures, for example at temperatures higher than 100° C., e.g. 120°-150° C., the following combination of properties:
good mechanical properties;
improved ionic conductivity.

The Applicant has surprisingly and unexpectedly found ionomeric membranes solving the above technical problem.

It is an object of the invention ionomeric membranes comprising (per)fluorinated, semicrystalline or amorphous, ionomeric polymers, having equivalent weight (EW) from 380 g/eq to 1,800 g/eq, preferably from 450 to 1,650 g/eq, which when used in fuel cell, under the following conditions:
membrane thickness 50 μm assembled between two electrodes catalyzed with 0.6 mg/cm² Pt supported on Carbon (Pt/C) and treated with 0.7 mg/cm² of Nafion®, having 10 cm² area; hydrogen and air feeding, both at the pressure of 0.25 MPa, both saturated with water at 80° C.; cell temperature 75° C.;

for membranes formed of copolymers TFE/$F_2C$=CF—O—$(CF_2)_2$—$SO_2F$, give the following maximum specific power values $P_{MAX}$ (maximum power for electrode surface unit), at the indicated EW values:
at EW=670 $P_{MAX}$ higher than 0.55 Watt/cm²;
at EW=830 $P_{MAX}$ higher than 0.66 Watt/cm²;
at EW=1,160 $P_{MAX}$ higher than 0.50 Watt/cm²;
at EW=1,600 $P_{MAX}$ higher than 0.32 Watt/cm².

The electrodes are formed of a carbon cloth having a thickness of 350 μm and weight for surface unit of 116 g/cm², said carbon cloth being treated on one side as described hereinafter:
a first treatment is carried out with a PTFE/carbon mixture so as to make the sheet surface hydrophobic;
subsequently, one side of the surface is catalyzed with Pt supported on carbon powder having surface area of 250 m²/g, the Pt concentration being 30% by weight with respect to the carbon powder and the Pt surface concentration being 0.6 mg/cm²;
the catalyzed side is treated with the ionomeric polymer having the following structure:

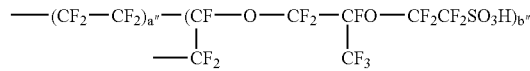

having equivalent weight 1,100 eq/g and a" and b" being such to give the required equivalent weight; so as to have a surface concentration of said polymer of 0.7 g/cm². The ionomeric polymer used in this step is commercially known with the trademark Nafion®.

Electrodes with these characteristics are marketed with the trademark ELAT® (E-TEK, Inc.).

The membranes according to the present invention contain ionomers, in particular (per)fluorinatedionomers. More preferably sulphonic ionomers are used having an equivalent weight from 380 to 1,800 g/eq, comprising:
(A) monomeric units deriving from one or more fluorinated monomers containing at least one ethylene unsaturation;
(B) fluorinated monomeric units containing sulphonyl groups —$SO_2F$ in amount to give an equivalent weight in the above range.

The fluorinated monomers of type (A) are selected from:
vinylidene fluoride (VDF);
$C_2$-$C_8$ perfluoroolefins, preferably tetrafluoroethylene (TFE);
$C_2$-$C_8$ chloro- and/or bromo- and/or iodo-fluoroolefins, such as chlorotrifluoroethylene (CTFE) and bromotrifluoroethylene;
$CF_2$=$CFOR_{f1}$ (per) fluoroalkylvinylethers (PAVE), wherein $R_{f1}$ is a $C_1$-$C_6$ (per)fluoroalkyl, for example trifluoromethyl, bromodifluoromethyl, pentafluoropropyl;
$CF_2$=CFOX perfluoro-oxyalkylvinylethers, wherein X is a $C_1$-$C_{12}$ perfluoro-oxyalkyl having one or more ether groups, for example perfluoro-2-propoxy-propyl.

The fluorinated monomers of type (B) are selected from one or more of the following:
$F_2C$=CF—O—$CF_2$—$CF_2$—$SO_2F$;
$F_2C$=CF—O—[$CF_2$—$CX_AF$—O$]_{nA}$—$(CF_2)_{nB}$—$SO_2F$ wherein $X_A$=Cl, F or $CF_3$; nA=1-10, nB=2, 3;
$F_2C$=CF—O—$CF_2$—$CF_2$—$CF_2$—$SO_2F$;
$F_2C$=CF—Ar—$SO_2F$ wherein Ar is an aryl ring.

Optionally the invention sulphonic fluorinated ionomers can contain from 0.01% to 2% by moles of monomeric units deriving from a bis-olefin of formula:

$$R_1R_2C=CH-(CF_2)_m-CH=CR_5R_6 \quad (I)$$

wherein:

m=2-10, preferably 4-8;

$R_1$, $R_2$, $R_5$, $R_6$, equal to or different from each other, are H or $C_1$-$C_5$ alkyl groups.

The introduction as comonomer of the bis-olefin of formula (I), having a number of unsaturations higher than the unit, is advantageous since said comonomer has the function to pre-crosslink the ionomer during the polymerization. The bisolefin introduction has also the advantage to increase the length of the primary chains forming the final reticule.

Other ionomers which can be used are those containing groups which in the activation phase (hydrolysis) are transformed into —COOH groups. Ionomers comprising —COOH and —SO$_3$H groups, after hydrolysis, can also be used.

The fluorinated monomers (B) used to prepare the ionomers containing —COOH groups have the following structures:

$F_2C=CF-O-CF_2-CF_2-Y$;
$F_2C=CF-O-[CF_2-CX_AF-O]_{nA}-(CF_2)_{nB}-Y$ wherein $X_A$=Cl, F O CF$_3$; nA=1-10; nB=2, 3;
$F_2C=CF-O-CF_2-CF_2-CF_2-Y$
$F_2C=CF-Ar-Y$ wherein Ar is an aryl ring;

wherein Y is a precursor group of the carboxylic group, selected from the following: CN, COF, COOH, COOR$_B$, COOM, CONR$_{2B}$R$_{3B}$, wherein R$_B$ is $C_1$-$C_{10}$, preferably $C_1$-$C_3$ alkyl and R$_{2B}$ and R$_{3B}$, equal or different, are H or have the R$_B$ meaning.

As said, the fluorinated monomers (B) with terminal Y having the above formulas can be in admixture with the fluorinated monomers containing sulphonyl groups —SO$_2$F, the total amount of monomers (B) being such to give the equivalent weight as above indicated.

Preferably the membranes of the present invention contain sulphonic perfluorinated ionomers comprising:
monomeric units deriving from TFE;
monomeric units deriving from CF$_2$=CF—O—CF$_2$CF$_2$SO$_2$F.

The ionomers, when they are amorphous (per)fluorinated polymers, can be crosslinked. To carry out the crosslinking, the ionomer is mixed with crosslinking agents.

The sulphonic fluorinated ionomers are crosslinked for example by peroxidic route. In this case they must contain radical attack sites in the backbone and/or in end position in the macromolecules, for example iodine and/or bromine atoms. Preferably the crosslinkable fluorinated sulphonic ionomers comprise:
monomeric units deriving from TFE;
monomeric units deriving from CF$_2$=CF—O—CF$_2$CF$_2$SO$_2$F;
monomeric units deriving from the bis-olefin of formula (I);
iodine atoms in terminal position.

The introduction in the chain of said iodine and/or bromine atoms, can be carried out by addition, in the reaction mixture, of brominated and/or iodinated "cure-site" comonomers, as bromo and/or iodo olefins having from 2 to 10 carbon atoms, as described for example in U.S. Pat. No. 4,035,565 and U.S. Pat. No. 4,694,045, or iodo and/or bromo fluoro-alkylvinylethers, as described in the patents U.S. Pat. Nos. 4,745, 165, 4,564,662 and EP 199,138, in such amounts that the "cure-site" comonomer content in the final product is generally between 0.05 and 2 moles per 100 moles of the other basic monomeric units.

Alternatively or also in combination with "cure-site" comonomers, the introduction of iodine and/or bromine terminal atoms can be carried out by addition to the reaction mixture of iodinated and/or brominated chain transfer agents as, for example, the compounds of formula $R_{fl}(I)_x(Br)_y$, wherein $R_{fl}$ is a (per)fluoroalkyl or a (per)fluorochloroalkyl having from 1 to 8 carbon atoms, while x and y are integers between 0 and 2, with $1 \leq x+y \leq 2$ (see for example the patents U.S. Pat. No. 4,243,770 and U.S. Pat. No. 4,943,622). It is also possible to use as chain transfer agents alkaline or alkaline-earth metal iodides and/or bromides, according to what described in the patent U.S. Pat. No. 5,173,553.

Preferably the crosslinking of radical type uses ionomers containing units of the bis-olefin of formula (I) and iodine in terminal position.

The sulphonic ionomer is crosslinked by radical way at a temperature between 100° C. and 200° C., in function of the type of peroxide used, adding a peroxide capable to generate radicals by heating. Generally, the peroxide amount is comprised between 0.1% and 5% by weight with respect to the polymer. Among them, the following can be mentioned: dialkylperoxides, as for example di-terbutyl-peroxide and 2,5-dimethyl-2,5-di-(terbutylperoxy)hexane; dicumyl peroxide; dibenzoyl peroxide; diterbutyl perbenzoate; di-1,3-dimethyl-3-(terbutylperoxy)butylcarbonate. Other peroxidic systems are described, for example, in patent EP 136,596 and EP 410,351.

Furthermore to the ionomer mixture with the crosslinking agents the following components can optionally be added:
a crosslinking co-agent, in an amount between 0.5 and 10%, preferably between 1 and 7% by weight with respect to the polymer; among crosslinking co-agents it can be mentioned: triallyl-cyanurate; triallyl-isocyanurate (TAIC); tris(diallylamine)-s-triazine; triallylphosphite; N,N-diallyl-acrylamide; N,N,N',N'-tetraallyl-malonamide; trivinyl-isocyanurate;2,4,6-trivinyl-methyltrisiloxane; N,N'bisallylbicyclo-oct-7-ene-disuccinimide (BOSA); bis olefin of formula (I), triazine;
a metal compound, in amounts between 1% and 15%, preferably between 2% and 10% by weight with respect to the polymer, said metal compound selected from divalent metal oxides or hydroxides as, for example, Mg, Zn, Ca or Pb, optionally combined with a weak acid salt as, for example, stearates, benzoates, carbonates, oxalates or Ba, Na, K, Pb, Ca phosphites;
conventional additives as thickeners, pigments, antioxidants, stabilizers and the like;
inorganic or polymeric reinforcing fillers, preferably optionally fibrillable PTFE. Preferably fillers have a particle size from 10 to 100 nm, preferably from 10 to 60 nm.

The ionomer can optionally be mixed with another fluoropolymer. For example crystalline fluoropolymers as PTFE, optionally modified with a comonomer as HFP (hexafluoropropene), VE (vinylethers), for example MFA, PFA, FEP, opzionally modified with VE; PVDF, ECTFE, ETFE, PCTFE, can be mentioned.

Fluoroelastomers, preferably perfluoroelastomers, co-curable with the ionomer, can also be used. Preferably for the co-curing the fluoroelastomer contains iodine and/or bromine atoms. The TFE/perf luoromethylvinylether copolymer having a ratio by moles between the two monomers between 80/20 and 60/40 can for example be mentioned. Said copolymer is for example described in EP 661,304 and is used in an amount between 0 and 50% by weight with respect to the ionomer.

The ionomer and fluoroelastomer mixture can be, for example, a physical blend of solid polymers or of polymerization latexes. In this case the peroxide percentages to be used are to be referred to the mixture formed by the ionomer and fluoroelastomer. Also for the optional agents added, their respective percentages by weight are referred to said mixture.

The crosslinking blend is prepared, for example, by using mechanical mixers.

When in the crosslinking phase iodine has been used, its residual traces can be removed from the membrane by thermal post-treatment, at temperatures preferably between 200° C. and 250° C.

The ionomer preparation can be carried out by a radical polymerization process in bulk, suspension, emulsion.

The aqueous emulsion or microemulsion polymerization can, for example, be mentioned. The surfactants usable in these polymerizations are (per)fluorinated surfactants, for example salts (as defined below) of the perfluorooctanoic, perfluorononanoic, perfluorodecanoic acid, or their mixtures, etc., (per)fluoropolyethers with an acid end group (example COOH, SO$_3$H), salified with NH$_4^+$ or with alkaline metal cations, the other end group being (per)fluorinated, optionally containing one H or Cl atom. The number average molecular weights of the perfluoropolyether surfactants are generally in the range 300-1,800, preferably 350-750.

The microemulsion polymerization is well known in the prior art.

In particular the ionomer preparation is carried out by using an aqueous emulsion wherein in the reaction medium as surfactants those of formula:

are used, wherein:
$X_1$ is equal to —COO, —SO$_3$;
M is selected from H, NH$_4$ or an alkaline metal;
$R_f$ represents a (per)fluoropolyether chain, preferably having number average molecular weight between about 230 and about 1,800, preferably between 300 and 750, said (per)fluoropolyether chain comprising repeating units selected from one or more of the following:
a) —(C$_3$F$_6$O)—;
b) —(CF$_2$CF$_2$O)—;
c) —(CFL$_0$O)—, wherein L$_0$=—F, —CF$_3$;
d) —CF$_2$(CF$_2$)$_{z'}$ CF$_2$O—, wherein z' is an integer 1 or 2;
e) —CH$_2$CF$_2$CF$_2$O—.

$R_f$ is monofunctional and has a (per) fluorooxyalkyl terminal T, for example CF$_3$O—, C$_2$F$_5$O—, C$_3$F$_7$O—; optionally in the perfluoroalkyl terminals one fluorine atom can be substituted with one chlorine or hydrogen atom. Examples of said terminals are Cl(C$_3$F$_6$O)—, H(C$_3$F$_6$O)—. The unit a) C$_3$F$_6$O is —CF$_2$—CF(CF$_3$)O— or —CF(CF$_3$)CF$_2$O—.

In the above indicated formula $R_f$ preferably has one of the following structures:
1) T—(CF$_2$O)$_a$—(CF$_2$CF$_2$O)$_b$—CF$_2$— with b/a between 0.3 and 10, extremes included, a being an integer different from 0;
2) T—(CF$_2$—(CF$_2$)$_{z'}$—CF$_2$O)$_b$—CF$_2$— wherein z' is an integer equal to 1 or 2;
3) T—(C$_3$F$_6$O)$_r$—(C$_2$F$_4$O)$_b$—(CFL$_0$O)$_t$—CF$_2$— with r/b=0.5-2.0 (r+b)/t=10-30, b and t being integers different from 0 when all the units with r, b, and t indexes are present; or b=t=0, or b=0;

a, b, b', r, t are integers, the sum of which is such that $R_f$ has the above values of number average molecular weight.

The compounds wherein $R_f$ has the following formula:

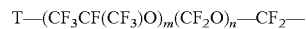

are still more preferred, wherein m/n=1-30;

wherein T=—OCF$_3$ or —OCF$_2$Cl.

The (per)fluoropolyethers Rf are obtainable with the well known processes of the prior art, see for example the following patents herein incorporated by reference: U.S. Pat. Nos. 3,665,041, 2,242,218, 3,715,378 and the European patent EP 239,123. The functionalized fluoropolyethers with hydroxyl termination are obtained for example according to patents EP 148,482, U.S. Pat. No. 3,810,874, from which the functional end groups are obtained with the processes mentioned in said patents.

It is also possible to use in the polymerization chain transfer agents. For example alkaline or alkaline-earth metal iodides and/or bromides, according to patent U.S. Pat. No. 5,173,553. Preferably chain transfer agents containing hydrogen, such as hydrocarbons, alcohols, in particular ethyl acetate and ethane, are used.

The polymerization initiators used in the process of the present invention are preferably radical inorganic initiators, as for exmple ammonium and/or potassium and/or sodium persulphate, optionally in combination with ferrous, cupreous or silver salts. The modalities of the initiator feeding to the polymerization reactor can be continuous or by a single addition at the polymerization starting.

The polymerization reaction is generally carried out at temperatures between 25° C. and 70° C., preferably between 50° and 60° C., under pressure up to 30 bar (3 MPa), preferably higher than 8 bar (0.8 MPa).

The monomer (B) is fed to the polymerization reactor in a continuous way or by steps.

When the polymerization is completed, the ionomer is isolated by conventional methods, as the coagulation by addition of electrolytes or by freezing.

Figure 1A:
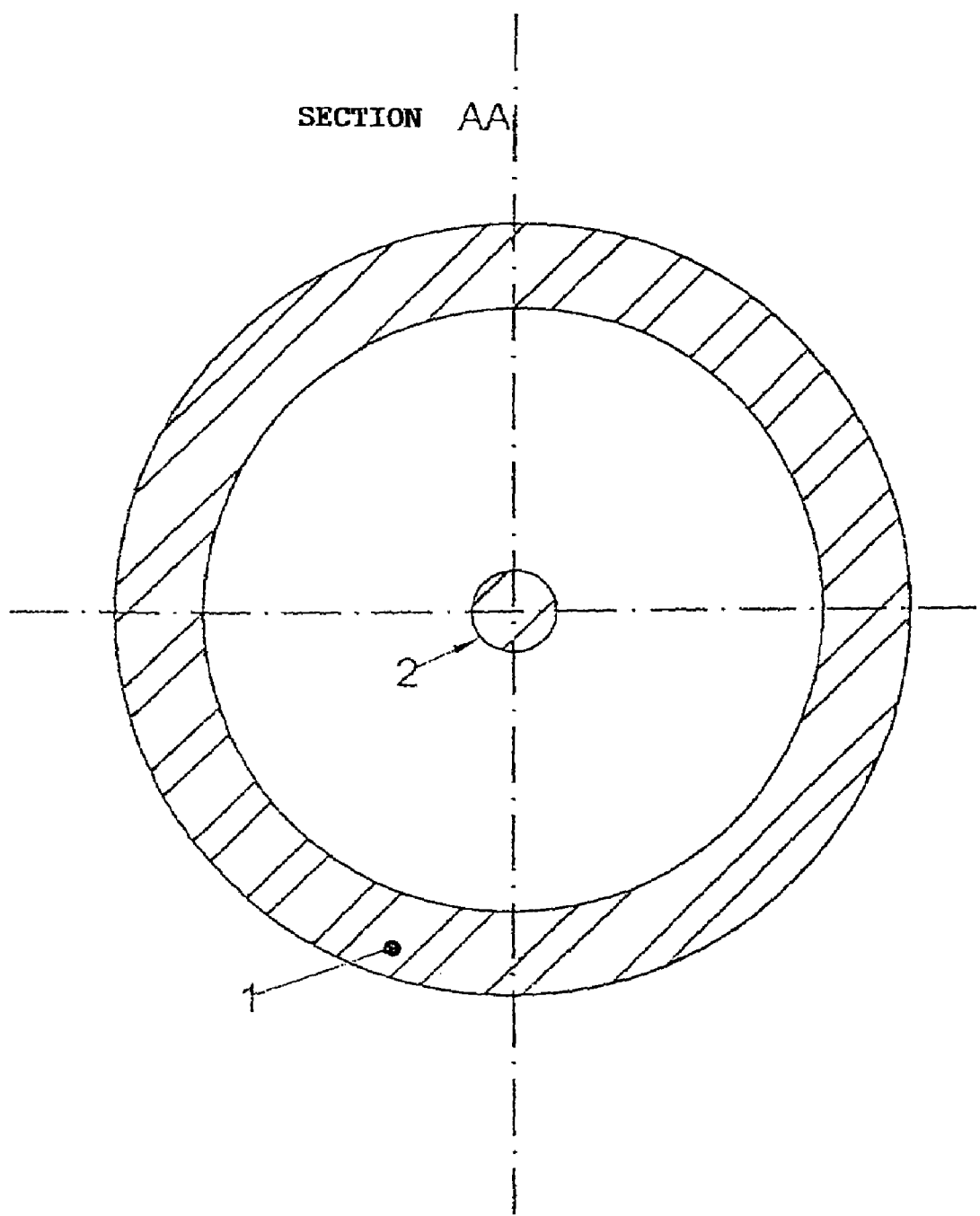

The membranes of the invention are obtainable through the process described hereinbelow and with reference to FIGS. 1 and 1a. FIG. 1 is a diagram of a mould used to obtain the (per)fluorinated ionomeric membranes of the invention. FIG. 1a is a cross-sectional view of the mould in FIG. 1 taken along line AA.

A further object of the present invention is a process to obtain the (per)fluorinatedionomeric membranes, comprising the following steps:
a) loading of the semicrystalline or amorphous (per) fluorinated polymer, solid or liquid, in a mould comprising (FIG. 1 and FIG. 1a):
   a hollow cylinder (1), equipped with thermocouple, not reported in the FIG., to measure the temperature on the internal surface of the cylinder (1);
   a cylinder (2) (chuck) having a diameter lower than that of the cylinder (1), equiaxial with cylinder (1), equipped with thermocouple, not reported in the FIG., to measure the temperature on the external surface of the cylinder (2);
   two rings (3) and (4), (FIG. 1) perpendicular to the axis of the cylinders closing the mould; at least one of said rings (3) and (4) being sliding along the chuck (2) to convey inside the cylinder the pressure applied on their surfaces;

said mould being equipped with heating means to heat the mould external surfaces;

b) degassing the mould containing the polymer, with the following steps:
  b') when the loaded polymer is solid, heating up to the polymer is in the liquid form, exerting inside the mould a pressure not lower than 0.5 MPa, preferably not lower than 1 MPa; generally by operating at pressures not higher than 50 MPa, preferably not higher than 30 MPa;
  b") when the loaded polymer is in the liquid state in the mould, the heating step is omitted and the pressures indicated in b') are used;
  the step b) being ended when the difference of temperature between the internal surface of the cylinder (1) and the external surface of the cylinder (2) is lower than 10° C.;
c) cooling of the mould until a temperature lower than 30° C., preferably to a temperature between 15° C. and 25° C., by operating at a pressure in the range 1 MPa-10 MPa; after the solidification of the polymer, extraction from the mould of the polymer manufactured article (sleeve);
d) obtainment of the membrane by sleeve exfoliation, carried out by rotating the sleeve on its longitudinal axis at a speed from 1 rpm to 500 rpm, putting the sleeve surface into contact with a blade, parallel to the cylinder axis, to obtain a film with a constant thickness.

The pressure requested in steps b) and c) is applied to the rings (3) and/or (4) of the mould.

As said, in step b) the degassing of the mould containing the polymer takes place through the interstices comprised. beetween the cylinders (1) and (2) and the rings (3) and (4).

Preferably in b') a heating gradient from 0.5° C./min to 10° C./min is used.

Preferably b') is carried out with the following steps:
$S_1$) polymer heating from room temperature to a temperature $T_1$ ranging from 50° C. to 130° C., with a heating rate $v_1$ ranging from 0.5° C./min to 10° C./min, by operating at a pressure $P_1$ preferably ranging from 10 MPa to 30 MPa;
$S_2$) residence time at temperature $T_1$ and pressure $P_1$ until the difference of temperature between the internal wall of the cylinder (1) and the external wall of the cylinder (2) ($\Delta T$) is lower than 20° C.;
$S_3$) polymer heating up to a temperature $T_2$ higher than $T_1$, $T_2$ ranging from 100° C. to 220° C., with a heating rate $v_2$ ranging from 0.5° C./min to 10° C./min, by operating at a pressure $P_2$ between 7 MPa and 12 MPa;
$S_4$) residence time at temperature $T_2$ and pressure $P_2$ until the difference of temperature $\Delta T$ is lower than 20° C.
$S_5$) polymer heating at a temperature $T_3$ higher than $T_2$, wherein $T_3$ ranges from 150° C. to 300° C., with a heating rate $v_3$ ranging from 0.5° C./min to 10° C./min, by operating at a pressure $P_3$ ranging from 1 MPa to 7 MPa;
$S_6$) residence time at temperature $T_3$ and pressure $P_3$ until $\Delta T$ in the mould containing the liquid polymer is lower than 10° C.

Preferably in c) one operates with a cooling gradient ranging from 0.1° C./min to 10° C./min.

Optionally step c) can be carried out with the following steps:
$S_7$) polymer cooling in the mould at temperature $T_4$ lower than the temperature $T_3$, wherein $T_4$ ranges from 70° C. to 200° C., the cooling rate $v_4$ ranging from 0.1° C./min to 1° C./min; by operating at a pressure $P_4$ from 1 MPa to 7 MPa;
$S_8$) residence time at temperature $T_4$ and pressure $P_4$ until $\Delta T$ is lower than 20° C.;
$S_9$) cooling from $T_4$ to a temperature lower than 30° C., preferably to a temperature ranging from 15° C. to 25° C., with a cooling rate $v_5$ from 0.5° C./min to 10° C./min; by operating at a pressure $P_5$ from 1 MPa to 7 MPa.

When a semicrystalline solid ionomer is used, in powder or in pellets, preferably in powder, it is obtained by coagulation and drying of the polymerization latex.

With semicrystalline ionomer it is meant a polymer having at least one melting endothermy at DSC (differential scanning. calorimetry).

When an amorphous ionomer is used (i.e. a polymer not showing a melting endothermy), from the latex coagulation process a compact polymer is obtained; in this case the ionomer can be loaded into the mould in pieces, or the polymer can be heated to become liquid and then to fill the mould.

Optionally the coagulated polymer can be milled. When the amorphous ionomers are crosslinkable, step b) can optionally be carried out in the presence of crosslinking agents, to obtain a cured polymer. In this case the crosslinking agents are premixed with the polymer before step a).

When the ionomer is a powder, the premixing can, for example, be carried out in an open mixer or in a jar-turner. When the ionomer is a compact mass, an open mixer as those used in the rubber processing, is used.

The sleeve obtained after step c) can have, for example, the following sizes:
OD, as defined in FIG. 1, from 60 mm to 1000 mm;
ID, as defined in FIG. 1, from 20 mm to 900 mm;
sleeve height from 100 mm to 1,500 mm.

The Applicant has found that for a sleeve having the following sizes: ID=80 mm, OD=120 mm, heigth=50 mm, the preferred cycles which can be used in steps b') and c) are the following:
b')
$S_1$ heating from T=20° C. to $T_1$=120° C. with rate $v_1$=3.3° C./min and pressure $P_1$=20 MPa;
$S_2$ residence time at $T_1$ for 120 min; pressure=20 MPa;
$S_3$ heating from $T_1$ to $T_2$=190° C. with rate $v_2$=2° C./min and pressure $P_2$=10 MPa;
$S_4$ residence time at $T_2$ for 90 min; pressure=10 MPa;
$S_5$ heating from $T_2$ to $T_3$ ranging from 210° C. to 260° C. with a rate $V_3$=2.3° C./min and pressure $P_3$=5 MPa;
$S_6$ residence time at $T_3$ for 180 min; pressure $P_3$=5 MPa;
c) cooling at $T_4$=20° C. at a rate $v_4$=0.5° C./min and pressure $P_3$=5 MPa.

The membranes according to the above process are obtained by exfoliatibn of a polymeric ionomer sleeve, obtained in the mould wherein the ionomer is initially loaded in melted form and then solidified.

With the process of the present invention continuous exfoliated membranes can be obtained, with productivity up to 30 m/min, having a constant thickness.

The exfoliated membrane thickness is in the range from 5 µm to 1,500 µm, preferably from 20 µm to 500 µm.

The exfoliated membranes are subjected to a treatment to obtain the acid groups from the corresponding precursor functional groups. In this step the sulphonyl group —$SO_2F$ is converted into sulphonic group —$SO_3H$ and the precursor groups Y into carboxylic groups.

For example for the sulphonic ionomers said treatment can be carried out in 2 steps:
hydrolysis with aqueous alkales and obtainment of the salified acid group; for example the —$SO_2F$ group is converted into —$SO_3K$;
acidification to convert the salt into the corresponding acid; for example the —$SO_3K$ group into —$SO_3H$.

For example the hydrolysis is carried out by immersing the membrane (film) into an aqueous solution containing 10% by weight of KOH, at a temperature between 60° C. and 80° C., for a time not lower than 2 hours. The membrane is then transferred into a distilled water bath at room temperature to remove the residual alkalinity. The subsequent acidification step is carried out, for example, by immersing the membrane into an aqueous solution containing 20% by weight of HCl, by operating at room temperature for a time not lower than 30 minutes. At the end a washing with demineralized water is carried out.

The membranes of the present invention can optionally be reinforced. In this case the membranes, before the conversion of the functional precursor groups of the acid groups, are adhered by hot lamination to a reinforcement net, preferably a PTFE net. One generally operates in a range of temperatures comprised between the starting melt and the end melt of the ionomer.

The ionomeric membranes of the present invention can be used in fuel cell applications or in electrolyzers for HCl, or also in electrolyzers for chloro-soda process.

As said, the membranes obtainable with the process of the present invention have an improved hydration, improved ionic conductivity and, used in cell, show improved mechanical properties. Tests carried out by the Applicant have shown that membranes obtained by extrusion, even with a reduced thickness, have a lower hydration, and the mechanical and dimensional properties have different values in the planar X and in planar transversal direction Y. In particular the elongation at break value in X direction is very low. Consequently, when used in fuel cells, during the start and stop cycles of the cell, breaks can happen due to dimensional variations of the membrane giving asimmetric tensions in the polymeric structure. It has been found that the membranes obtained by extrusion are prone to break in X direction, in particular in correspondence of the gasket border the place wherein the greatest mechanical tensions develop.

The Applicant has found that the membranes of the invention are substantially isotropic in the planar direction X and Y as regards both the dimensional variations due to the membrane hydration and to the mechanical properties. The Applicant has furthermore found that the membranes of the invention have improved elongation at break, higher than 150% (ASTM D 1708), even with very thin thicknesses, in X and Y directions, compared with membranes having the same composition but obtained by extrusion.

As said, the membranes of the invention can also be obtained with very thin thickness. In this way it is possible to obtain lower ohmic drops in the electrochemical cell.

Unexpectedly and surprisingly the Applicant has found that the membranes obtained with the process of the present invention have an improved performance in cell in comparison with the membranes obtained by extrusion, since they show an improved maximum specific power.

Surprisingly and unexpectedly, the Applicant has found that the membranes of the present invention have an improved hydration in comparison with the membranes obtained by extrusion. See the comparative Examples.

An improved hydration allows to use ionomers having higher equivalent weights (EW), in comparison with those used in the membranes obtained by extrusion, obtaining the same conductivity. This is advantageous since it allows to obtain still improved mechanical properties, therefore a longer life of the membrane.

The membranes of the present invention can in particular be used in the car industry, wherein cells having a high power density obtained with very thin membranes are required.

The membranes of the invention, as said, in comparison with the membranes obtained by extrusion, show an improved reliability to thermal cycles during the use of the membranes.

In electrochemical applications, for example in the hydrochloric acid electrolysis, it is known to use ionomeric membranes having high sizes. According to the prior art, for this application membranes having a high width, even over the metre, and length higher than about 2 metres, and furthermore having high thickness, generally of the order of 100-500 µm, preferably 100-300 µm, can be used to guarantee suitable mechanical properties. It is also known to use supports for said membranes, as for example PTFE nets. In this application membranes of the present invention having reduced sizes compared with those of the prior art, can be used. In addition, the use of supports is optional with the membranes of the present invention.

This represents an advantage from the industrial point of view.

Further the membranes of the present invention can also be obtained with ionomers having even very low MFI values (ASTM D 1238-52T), for example equal to 0.6 g/10 min (280° C., 10 Kg) or lower, therefore having very high molecular weight. As known very low MFI ionomers are hardly processable by extrusion. Therefore from an industrial point of view it is not practically possible to obtain extruded membranes with said ionomers. Therefore the present invention makes available membranes of ionomers having a very high molecular weight and therefore with still improved mechanical properties.

The present invention will be better illustrated by the following embodiment Examples, having a merely indicative but not limitative purpose for the scope of the invention itself.

EXAMPLES

Characterization

Hydration Percentage and Determination of the Membrane Dimensional Variation

A membrane rectangular piece, cut so that one side is parallel to MD (machine direction) and the other to TD (transversal direction), is initially dried at 105° C. under vacuum for 1 hour. The piece is weighed and its sizes are determined. Successively the membrane is hydrated in distilled water at 100° C. for 30 minutes. After water removal, the water excess on the surface is removed and the membrane is weighed again and the sizes measured.

The hydration percentage (Hydr. %) of the membrane is evaluated according to the following formula:

Hydr. %=(final weight−initial weight)/initial weight× 100.

The dimensional variations in the two orthogonal directions are determined as per cent referred to the corresponding initial sizes obtained after drying at 105° C. under vacuum for 1 hour.

Stress and Elongation at Break

These properties are determined at the temperature of 23° C. and 50% of relative humidity, according to ASTM D 1708.

Melt Flow Index (MFI) Determination

The detrmination is carried out according to the ASTM D 1238-52T standard.

Equivalent Weight Determination

A polymer film in acid form, obtained with the processes indicated in the Examples, is dried at 105° C. up to constant weight and weighed; then the film is suspended in a hydroalcohlic, or aqueous, solution, an excess of a titrated NaOH solution is added and it is titrated back with a titrated HCl solution. The equivalent weight is determined from the ratio between the film weight, expressed in grams, and the number of titrated acid group equivalents.

Power Determination in Fuel Cell

The membrane is assembled between two electrodes ELAT® (E-TEK, Inc.) catalyzed with 0.6 mg/cm² Pt/C and treated with 0.7 mg/cm² of Nafion®, having a 10 cm² area; the cell is fed from the anode side with hydrogen and from the cathode side with air. The pressure of the gas fed to the cell is equal and is 0.25 MPa. The cell temperature is maintained at 75° C. and the feeding gases are previously saturated with water at 80° C.

By a load applied to the external circuit to the cell the current intensity is regulated (current for electrode surface unit) and the voltage is measured at the two cell poles. The operation is repeated by using various external loads. The voltage obtained at different current intensities in the cell is determined. The specific power (Watt/cm²) or power for electrode surface unit is determined by the product between the current intensity and the voltage.

Example 1

Ionomer Preparation

In a 22 litre autoclave the following reactants are introduced:

- 11.5 litres of demineralized water;
- 980 g of the monomer of formula $CF_2=CF-O-CF_2CF_2-SO_2F$;
- 3,100 g of an aqueous solution at 5% by weight of a fluoropolyoxyalkylene with acid terminal having number average molecular weight 521 potassium salified, of formula:

$CF_2ClO(CF_2CF(CF_3)O)_n(CF_2O)_mCF_2COOK$ wherein n/m=10;

The autoclave, kept under stirring at 540 rpm, is heated to 60° C. Then 225 ml of an aqueous solution at concentration 6 g/l of potassium persulphate (KPS) are fed into the autoclave. The pressure is brought to absolute 1.3 MPa by introducing TFE. The reaction starts after 4 min. The pressure is maintained at absolute 1.3 MPa by feeding TFE. When 1,000 g of TFE have been fed to the reactor, 175 g of the sulphonyl monomer of formula $CF_2=CF-O-CF_2-CF_2-SO_2F$ are introduced. Subsequently 175 g of the same sulphonic monomer are introduced in the reactor every 200 g of TFE fed. The total TFE mass fed to the reactor is 4,000 g.

The reaction is stopped after 233 min by interrupting the TFE feeding, cooling and venting the reactor under vacuum. The produced latex has a solid content of 28.5% by weight. The latex is coagulated by freezing and defreezing, the polymer separated from the mother liquors, washed with water up to a constant pH of the washing waters, and dried at 150° C. for 40 h at room pressure.

The polymer has MFI=2.5 g/10 min (280° C., 5 kg).

By DSC it is determined that the polymer is semicrystalline. The second melting enthalpy value is 5.2 J/g.

Example 1A

Preform Preparation and Exfoliation 2 kg of the polymer powder obtained in the Example 1 are fed into a stainless steel cylindrical mould having the following sizes: OD=120 mm; ID=80 mm; height=340 mm. The two opposite cylinder faces are closed with two bronze rings having the following sizes: OD=119.8 mm; ID=80.2 mm; height=20 mm.

The mould is placed in a vertical press and on the upper bronze ring a pressure of 20 MPa is applied to remove the most part of air and of the gases contained in the powder. After 20 minutes the applied pressure is decreased and the mould is wound with an electrical heater and put in vertical press with heated plates.

The mould is then subjected to the following thermal cycle:

$S_1$) heating from room temperature to 120° C. with a heating rate of 3.3° C./min, constant pressure of 20 MPa;

$S_2$) residence time at 120° C. and constant pressure of 20 MPa for 2 hours, so that the temperature difference between the internal wall of the cylinder (1) and the external wall of the cylinder (2) ($\Delta T$) is lower than 20° C.;

$S_3$) heating from 120° C. to 190° C. with heating rate of 2° C./min and pressure of 10 MPa;

$S_4$) residence time at 190° C. and constant pressure of 10 MPa for 1.5 hours, so that the difference of temperature $\Delta T$ is lower than 20° C.

$S_5$) heating from 190° C. to 250° C. with rate of 2° C./min, pressure of 5 MPa;

$S_6$) residence time at 250° C., pressure of 5 MPa for 3 hours, so that $\Delta T$ is lower than 10° C.;

c) cooling from 250° C. to room temperature at a pressure of 5 MPa with rate of 0.3° C./min.

When the mould is cooled at room temperature, a sleeve is extracted having the following sizes: OD=120 mm; ID=80 mm; height=150 mm.

The sleeve is let rotate along its central longitudinal axis at a rotation speed of 30 rpm and exfoliated on the surface, along the whole length, with a blade having a length at least equal to or higher than the sleeve heigth. The exfoliation is carried out at room temperature (20° C.) so as to obtain thin films having the thickness as indicated hereunder. During the exfoliation the sleeve is let advance towards the blade so as to maintain the thickness of the exfoliated film unchanged. Films of various thickness, depending on the advancement rate of the sleeve towards the blade, were obtained. The thicknesses of the obtained films were, respectively, of 25 μm, 50 μm, 80 μm, 100 μm and 150 μm.

Example 1B

Preparation of the Membrane in Acid Form and Determination of the Equivalent Weight Per Cent Hydration and Tensile Properties of the Membrane From the film having a 50 μm thickness prepared in the Example 1A, rectangular-shaped specimens were cut out. The specimens are treated at 80° C. for 24 h with KOH at 10% by weight, followed by washing with demineralized water, subsequent treatment at room temperature for 24 h with HCl at 20% by weight and final washing in demineralized water. In this way the film sulphonyl groups are converted into acid sulphonic groups.

The copolymer equivalent weight is 830 g/eq, corresponding to a 84.6% molar composition of TFE and 15.4% molar of sulphonic monomer.

The hydration percentage is 65% and the dimensional increase, which is equal in both the directions (MD and TD), is 28%.

The film mechanical properties in MD and TD direction are the following (thickness 50 μm):

| | |
|---|---|
| stress at break (MPa) | 30 |
| elongation at break (%) | 178 |

Example 1C

Measurements in Fuel Cell

The membrane obtained in the Example 1B having a 50 μm thickness is assembled between two electrodes ELAT® (E-TEK, Inc.) catalyzed with 0.6 mg/cm² Pt/C and treated with 0.7 mg/cm² of Nafion®, having 10 cm² area; the cell is fed with hydrogen and air both at the pressure of 0.25 MPa. The cell temperature is maintained at 75° C. and the feeding gases are saturated with water at 80° C. It is found that under said conditions the cell supplies a current of 1.65 A/cm² at 0.4 V.

The maximum specific power supplied is of 0.70 W/cm² at 0.47 V.

Example 1D (Comparative)

The polymer of the Example 1 is subjected to extrusion at 245° C. by Braebender extruder to obtain granules. Successively the granules are extruded at 250° C., obtaining a film having a 50 μm thickness.

The film sulphonyl groups are hydrolyzed to acid groups as described in the Example 1B.

The hydration percentage is 49% and the dimensional increase is 12% in MD and 25% in TD.

The film mechanical properties in MD and TD direction are the following (50 μm thickness):

| MD direction: | |
|---|---|
| Stress at break (MPa) | 28 |
| Elongation at break (%) | 125 |

| TD direction: | |
|---|---|
| Stress at break (MPa) | 26 |
| Elongation at break (%) | 132 |

Comments to the Example 1D Comp.

The extruded membrane shows anisotropy as regards the size variations and the mechanical properties. Indeed in both cases the obtained values depend on the considered direction. In particular it is noticed that the elongation at break in MD and also the hydration percentage give values clearly lower than the corresponding values obtained in the Example 1B according to the invention. Therefore the membrane obtained by extrusion has not very good mechanical and hydration propeties.

Example 1E (Comparative)

Measurements in Fuel Cell

The Example 1C is repeated by using the membrane of the Example 1D (comparative) having 50 μm thickness. Under these conditions the cell supplies a current of 1.47 A/cm² at 0.4 V.

The maximum specific power supplied is 0.66 W/cm² at 0.54 V.

Comments to the Example 1E Comp.

The data obtained in the Example show that the fuel cell performance working with extruded membrane are lower than those of the fuel cell of the Example 1C which uses the membrane according to the present invention.

Example 2

Polymerization

In a 22 litre autoclave the following reactants are introduced:
- 11.5 litres of demineralized water;
- 980 g of the monomer of formula $CF_2=CF-O-CF_2CF_2-SO_2F$;
- 3,100 g of an aqueous solution at 5% by weight of a fluoropolyether having formula: $CF_2ClO(CF_2CF(CF_3)O)_n(CF_2O)_mCF_2COOK$ and average molecular weight 559.

The autoclave, kept under stirring at 540 rpm, is heated to 60° C. The pressure in autoclave is brought to 0.02 MPa with ethane. 150 ml of an aqueous solution at concentration 6 g/l of potassium persulphate (KPS) are then fed into the autoclave. The pressure is brought to 1.7 MPa by introducing TFE. The reaction starts after 4 min. The pressure is maintained at 1.7 MPa by feeding TFE. When 1,000 g of TFE have been fed, 126 g of the sulphonyl monomer of formula $CF_2=CF-O-CF_2-CF_2-SO_2F$ are introduced in the reactor. Subsequently 126 g of the same sulphonyl monomer are introduced in the reactor every 200 g of TFE fed. The total TFE mass fed to the reactor is 3,400 g.

The reaction is stopped after 320 min from the start, by lessening the stirring, cooling and venting the reactor under vacuum. The produced latex has a solid content of 24.2% by weight. The latex is coagulated by freezing and defreezing, the polymer separated from the mother liquors, washed with water until a constant pH of the washing waters, and dried at 150° C. for 40 h at room pressure. The polymer has MFI=1.7 g/10 min (280° C., 5 kg).

By DSC it is determined that the polymer is semicrystalline. The second melting enthalpy value is of 10.1 J/g.

Example 2A

Preform Preparation and Exfoliation

The Example 1A is repeated with the ionomer prepared in the Example 2 but by using the following cycle:

$S_1$) heating from room temperature to 120° C. with a heating rate of 3.3° C./min and constant pressure of 20 MPa;

$S_2$) residence time at 120° C. for 2 hours at the constant pressure of 20 MPa;

$S_3$) heating from 120° C. to 190° C. with heating rate of 2° C./min, pressure of 10 MPa;

$S_4$) residence time at 190° C. for 1.5 hours at the pressure of 10 MPa;

$S_5$) heating from 190° C. to 260° C. with heating rate of 2° C./min at the pressure of 5 MPa;

$S_6$) residence time at 260° C. for 3 hours at the pressure of 5 MPa;

$S_7$) cooling from 260° C. to room temperature with cooling rate of 0.3° C./min at the pressure of 5 MPa.

When the mould is cooled, a sleeve is extracted having the same sizes as that obtained in the Example 1A.

The exfoliation is carried out likewise as described in the Example 1A. Films having the same thicknesses as those indicated in the Example 1A are obtained.

Example 2B

Preparation of the Membrane in Acid Form and Determination of the Equivalent Weight, Per Cent Hydration and Tensile Properties of the Membrane From the films prepared in the Example 2A and having a thickness of 50 µm and 80 µm, respectively, rectangular-shaped specimens were cut out. The specimens were treated at 80° C. for 8 h with a mixture of $H_2O$/KOH/dimethylsulphoxide in the weight ratios 55/15/30, then washed with demineralized water and subsequently treated at room temperature for 24 h with HCl at 20% by weight. Lastly a washing with demineralized water was carried out. In this way the film sulphonyl groups were converted into acid sulphonic groups.

The copolymer equivalent weight is 1,160 g/eq, corresponding to a 89.8% molar composition of TFE and 10.2% molar of sulphonic monomer.

The hydration percentage is 36% and the size increase, which is equal in both the directions (MD and TD), is 15%.

Example 2C

Measurements in Fuel Cell

The Example 1C is repeated but by using the membrane of the Example 2B having a thickness of 50 µm. Under these conditions the cell supplies a current of 1.33 A/cm² at 0.4 V and 0.85 A/cm² at 0.6 V.

The maximum specific power supplied is 0.56 W/cm² at 0.47 V.

Example 2D (Comparative)

The polymer of the Example 2 is subjected to extrusion at 280° C. by Braebender extruder to obtain granules. Subsequently the granules are extruded at 280° C., obtaining a film having a thickness of 50 µm.

The film sulphonyl groups are hydrolyzed to acid groups as described in the Example 2B.

The hydration percentage is 22% and the size increase in MD is 2% and in TD 12%.

Example 2E (Comparative)

The Example 1C is repeated but by using the membrane of the Example 2D (comparative) having a thickness of 50 µm. Under these conditions the cell supplies a current of 1.20 A/cm² at 0.4 V and 0.75 A/cm² at 0.6 V.

The maximum specific power supplied is 0.50 W/cm² at 0.48 V.

The data herein obtained, compared with those of the Example 2C, confirm the previous comments to the Example 1E (comparative).

Example 3

Polymerization

In a 22 litre autoclave the following reactants are introduced:
  11.5 litres of demineralized water;
  980 g of the monomer of formula $CF_2$=CF—O—$CF_2CF_2$—$SO_2F$;

3,100 g of an aqueous solution at 5% by weight of a fluoropolyether having formula:
    $CF_2ClO(CF_2CF(CF_3)O)_n(CF_2O)_mCF_2COOK$ and average molecular weight 559.

The autoclave is kept under stirring at 540 rpm and heated to 60° C. The pressure in the autoclave is brought to 0.04 MPa with ethane. Then 150 ml of an aqueous solution at concentration 6 g/l of potassium persulphate (KPS) are fed into the autoclave. The pressure is brought to 2 MPa by introducing TFE. The reaction starts after 2 min. The pressure is then maintained constant at 2 MPa by feeding TFE. 1,000 g of TFE are then fed, 126 g of the sulphonyl monomer of formula $CF_2$=CF—O—$CF_2$—$CF_2$—$SO_2F$ are introduced in the reactor. Subsequently 126 g of the same sulphonyl monomer are introduced in the reactor every 200 g of TFE fed. The total TFE mass fed to the reactor is equal to 4,000 g. The reaction is stopped after 284 min from the start, by lessening the stirring, cooling and venting the reactor under vacuum. The produced latex has a solid content of 25.1% by weight. The latex is coagulated by freezing and defreezing, the polymer separated from the mother liquors, washed with water until a constant pH of the washing waters, and dried at 150° C. for 40 h at room pressure. The polymer has a MFI value equal to 0.6 g/10 min (280° C., 10 kg), value much lower than those obtained in the previous polymerization Examples (Examples 1 and 2).

By DSC it is determined that the polymer is semicrystalline. The second melting enthalpy value is of 16.1 J/g.

Example 3A

Preform Preparation and Exfoliation

The Example 2A is repeated but by using the ionomer prepared in the Example 3.

When the mould has been cooled, a sleeve is extracted having the same sizes as that obtained in the Example 1A.

The exfoliation is carried out likewise as described in the Example 1A. Films having the same thicknesses as those indicated in the Example 1A are obtained.

Comments to the Example 3A

The technology for obtaining the polymer film by exfoliation allows to prepare thin films also from polymers having very low MFI values. As a matter of fact, from a polymer having a MFI value as that indicated in the Example 3, it would be very difficult to obtain a thin film by extrusion.

Example 3B

Preparation of the Membrane in Acid Form and Determination of the Equivalent Weight. Per Cent Hydration and Tensile Properties of the Membrane The Example 2B was repeated but by using the films obtained in the Example 3A, having a thickness of 50 µm, 100 µm and 150 µm, respectively.

The copolymer equivalent weight is 1,600 g/eq, corresponding to a 93.0% molar composition of TFE and 7.0% molar of sulphonic monomer.

The hydration percentage is 18% and the size increase, equal in both the directions (MD and TD), is 10%.

The film mechanical properties in MD and TD direction are the following (thickness 150 µm):

| | |
|---|---|
| stress at break (MPa) | 34 |
| elongation at break (%) | 180 |

Example 3C

Measurements in Fuel Cell

The Example 1C is repeated by using the membrane of the Example 3B having a thickness of 50 µm. Under said conditions the cell supplies a current of 0.85 A/cm² at 0.4 V and 0.57 A/cm² at 0.6 V.

The maximum specific power supplied is 0.37 W/cm² at 0.48 V.

Example 4

Polymerization

In a 22 litre autoclave the following reactants are introduced:
- 11.5 litres of demineralized water;
- 980 g of the monomer of formula $CF_2=CF-O-CF_2CF_2-SO_2F$;
- 3,100 g of an aqueous solution at 5% by weight of a fluoropolyether having formula:
  $CF_2ClO(CF_2CF(CF_3)O)_n(CF_2O)_mCF_2COOK$ and average molecular weight 559.

The autoclave is kept under stirring at 540 rpm and heated to 50° C. Then 300 ml of an aqueous solution at concentration 28 g/l of potassium persulphate (KPS) are fed into the autoclave. The pressure is brought to 1.2 MPa by introducing TFE. The reaction starts after 1 min. The pressure is maintained constant at 1.2 MPa by feeding TFE. When 1,000 g of TFE have been fed, 175 g of the sulphonyl monomer of formula $CF_2=CF-O-CF_2-CF_2-SO_2F$ are introduced in the reactor. Subsequently 175 g of the same sulphonyl monomer are introduced in the reactor every 200 g of TFE fed. The total TFE mass fed to the reactor is 4,000 g. The reaction is stopped after 224 min from the start by lessening the stirring, cooling and venting the reactor under vacuum. The produced latex has a solid content of 28.8% by weight. The latex is coagulated by freezing and defreezing, the polymer separated from the mother liquors, washed with water until a constant pH of the washing waters, and dried at 150° C. for 40 h at room pressure. The polymer has a MFI=1 g/10 min (280° C., 10 kg).

By DSC it is determined that the polymer is semicrystalline. The second melting enthalpy value is of 7.9 J/g.

Example 4A (Comparative)

The polymer of the Example 4 is subjected to extrusion at 320° C. by Braebender extruder to obtain granules. The extrusion temperature used is high in connection with the rather low MFI value of the polymer. Successively the granules are extruded in films at 320° C. It has been found that the minimum film thickness obtainable under the used extrusion conditions is 60 µm.

The film sulphonyl groups are hydrolyzed to acid groups as described in the Example 1B.

The copolymer equivalent weight is 970 g/eq, corresponding to a molar composition 87.3% of TFE and 12.7% of sulphonic monomer.

The hydration percentage is 33% and the size increase is 8% in MD and 19% in TD.

The film mechanical properties in MD and TD direction are the following (140 µm thickness):

| MD direction: | |
|---|---|
| Stress at break (MPa) | 34 |
| Elongation at break (%) | 99 |

| TD direction: | |
|---|---|
| Stress at break (MPa) | 25 |
| Elongation at break (%) | 142 |

Comments to the Example 4a Comp.

The results of the determinations of the mechanical properties show that the membrane has an anisotropic behaviour. Furthermore the elongation at break value in MD direction is the lowest among those reported in the above Examples. Therefore the mechanical properties are not suitable to the film use as a membrane.

Furthermore the hydration percentage (33%) of the membrane of the Example 4A Comp., prepared with a copolymer having equivalent weight 970 g/eq, is comparable with that obtained in the Example 2B according to the invention (36%), wherein a membrane having a higher equivalent weight, of 1,160 g/eq, was used.

The Example confirms therefore that the membranes of the present invention show the same hydration percentage of the membranes obtained by extrusion but with a higher equivalent weight.

Example 5

Polymerization

In a 22 litre autoclave the following reactants are introduced:
- 11.5 litres of demineralized water;
- 980 g of the monomer of formula $CF_2=CF-O-CF_2CF_2-SO_2F$;
- 3,100 g of an aqueous solution at 5% by weight of a fluoropolyether having formula:
  $CF_2ClO(CF_2CF(CF_3)O)_n(CF_2O)_mCF_2COOK$ and average molecular weight 559.

The autoclave, kept under stirring at 540 rpm, is heated to 50° C. Then 300 ml of an aqueous solution at concentration 28 g/l of potassium persulphate (KPS) are fed into the autoclave. The pressure is brought to 0.9 MPa by introducing TFE. The reaction starts after 10 min. The pressure is maintained at 0.9 MPa by feeding TFE. When 600 g of TFE have been fed, 210 g of the sulphonyl monomer of formula $CF_2=CF-O-CF_2-CF_2-SO_2F$ are introduced in the reactor. Subsequently 200 g of the same sulphonyl monomer are introduced in the reactor every 150 g of TFE fed. The total TFE mass fed to the reactor is 3,000 g. The reaction is stopped after 230 min from the start by lessening the stirring, cooling and venting the reactor under vacuum. The produced latex has a solid content of 25.0% by weight. The latex is coagulated by freezing and defreezing, the polymer separated from the mother liquors, washed with water until a constant pH of the washing waters, and dried at 120° C. for 40 h at room pressure. The polymer has a MFI=87 g/10 min (280° C., 5 kg).

By DSC it is determined that the polymer is semicrystalline. The second melting enthalpy value is very low and equal to 0.1 J/g.

Example 5A

Preform Preparation and Exfoliation

The Example 1A is repeated with the ionomer prepared in the Example 5 but using the following cycle:

$S_1$ heating from room temperature to 120° C. with a heating rate of 3.3° C./min and constant pressure of 20 MPa;

$S_2$ residence time at 120° C. for 2 hours at the constant pressure of 20 MPa;

$S_3$ heating from 120° C. to 190° C. with heating rate of 2° C./min, pressure 10 MPa;

$S_4$ residence time at 190° C. for 1.5 hours at the pressure of 10 MPa;

$S_5$ heating from 190° C. to 210° C. with heating rate of 2° C./min at the pressure of 5 MPa;

$S_6$ residence time at 210° C. for 3 hours at the pressure of 5 MPa;

$S_7$ cooling from 210° C. to room temperature with rate of 0.3° C./min at a pressure of 5 MPa.

When the mould has been cooled, a sleeve is extracted having the same sizes as that obtained in the Examnple 1A.

The exfoliation is carried out likewise as described in the Example 1A. Films having the same thicknesses as those indicated in the Example 1A are obtained.

Example 5B

Preparation of the Membrane in Acid Form and Determination of the Equivalent Weight, Per Cent Hydration and Tensile Properties of the Membrane The Example 1B was repeated but by using the films obtained in the Example 5A, having a thickness of 50 μm, 100 μm, respectively.

The copolymer equivalent weight is 670 g/eq, corresponding to a molar composition 79.6% of TFE and 20.4% of sulphonic monomer.

The hydration percentage is 123% and the size increase, equal in both the directions (MD and TD), is 42%.

Example 5C

Measurements in Fuel Cell

The Example 1C is repeated but by using the membrane of the Example 5B having a thickness of 50 μm. Under said conditions the cell supplies a current of 1.46 A/cm$^2$ at 0.4 V and 0.74 A/cm$^2$ at 0.6 V.

The maximum specific power supplied is 0.60 W/cm$^2$ at 0.46 V.

Example 6

Preparation of a Reinforced Membrane

The ionomer film in sulphonyl fluoride form having a thickness of 150 micrometers obtained in the Example 3A is placed on a PTFE net constituited by interlaced PTFE threads and having a mesh opening of 42.5 mm$^2$/cm$^2$. The obtained composite is placed between two aluminum plates and positioned in press for the welding treatment. A pressure of 1 MPa is applied for 10 minutes at a temperature of 260° C.

At the end of the treatment the composite film is extracted and it is cooled under pressure of 0.1 MPa until reaching the room temperature. A film is thus obtained with a PTFE support which is homogeneously adhered and englobed in the polymeric film. The sulphonyl fluoride groups are transformed into acid form with the process described in the Example 2B. The obtained reinforced membrane Keeps planar. The PTFE net remains perfectly adhered to the membrane ionomeric layer.

The reinforced membrane of the present Example results particularly useful for the electrolysis process of the hydrochloric acid.

The invention claimed is:

1. A method of using a membrane in fuel cell applications, comprising the step of providing an ionomeric membrane made of (per)fluorinated, semicrystalline or amorphous, ionomeric polymers, having equivalent weight (EW) from 380 g/eq to 1,800 g/eq, when used in a fuel cell under the following conditions:

50 μm membrane thickness assembled between two electrodes catalyzed with 0.6 mg/cm$^2$ Pt supported on Carbon (Pt/C) and treated with 0.7 mg/cm$^2$ of perfluorinated polymer, having 10cm$^2$ area; hydrogen and air feeding, both at the pressure of 0.25 MPa, both saturated with water at 80° C.; cell temperature 75° C.; and is formed of copolymers of TFE/F$_2$C=CF—O—(CF$_2$)$_2$—SO$_2$F, gives the following maximum specific power values ($P_{MAX}$), at the indicated EW values:

| | |
|---|---|
| EW = 670 | $P_{MAX}$ higher than 0.55 Watt/cm$^2$; |
| EW = 830 | $P_{MAX}$ higher than 0.66 Watt/cm$^2$; |
| EW = 1,160 | $P_{MAX}$ higher than 0.50 Watt/cm$^2$; |
| EW = 1,600 | $P_{MAX}$ higher than 0.32 Watt/cm$^2$. |

2. The method of claim 1, wherein the ionomeric membrane comprises (per)fluorinated ionomers comprising:
  (A) monomeric units deriving from one or more fluorinated monomers containing at least one ethylene unsaturation; and
  (B) fluorinated monomeric units containing suiphonyl groups —SO$_2$F in amount to give an equivalent weight in the indicated range.

3. The method of claim 2, wherein the fluorinated monomers of type (A) are selected from:
  vinylidene fluoride (VDF);
  $C_2$-$C_8$ perfluoroolefins;
  $C_2$-$C_{O8}$ chloro- and/or bromo- and/or iodo-fluoroolefins;
  CF$_2$=CFOR$_{f1}$ (per)fluoroalkylvinylethers (PAVE), wherein R$_{f1}$ is a $C_1$-$C_6$ (per)fluoroalkyl;
  CF$_2$=CFOX perfluoro-oxyalkylvinylethers, wherein X is a $C_1$-$C_{12}$ perfluoro-oxyalkyl having one or more ether groups.

4. The method of claim 3, containing sulphonic perfluorinate ionomers comprising:
  monomeric units deriving from TFE;
  monomeric units deriving from CF$_2$=CF—O—CF$_2$CF$_2$SO$_2$F.

5. The method of claim 2, wherein the fluorinated monomers of type (B) are selected from one or more of the following:
  F$_2$C=CF—O—CF$_2$—CF$_2$—SO$_2$F;
  F$_2$C=CF—O—[CF$_2$—CX$_A$F—O]$_{nA}$—(CF$_2$)$_{nB}$—SO$_2$F wherein X$_A$=Cl, F or CF$_3$; nA=1-10, nB=2, 3;
  F$_2$C=CF—O—CF$_2$CF$_2$—CF$_2$—SO$_2$F;
  F$_2$C=CF—Ar—SO$_2$F wherein Ar is an aryl ring.

6. The method of claim 2, wherein alternatively the fluorinated monomers (B) are selected from the following:

$F_2C=CF-O-CF_2-CF_2-Y$;
$F_2C=CF-O-[CF_2-CX_AF-O]_{nA}-(CF_2)_{nB}-Y$
$F_2C=CF-O-CF_2-CF_2-CF_2-Y$
$F_2C=CF-Ar-Y$;

wherein $X_A$=Cl, F or $CF_3$; nA=1-10, nB=2, 3; Ar is an aryl ring; Y is a precursor group of the carboxylic group, selected from the following: CN, COF, COON, $COOR_B$, COOM, $CONR_{2B}R_{3B}$, wherein $R_B$ is $C_1$-$C_{10}$, and $R_{2B}$ and $R_{3B}$, equal or different, are H or have the $R_B$ meaning;

optionally said fluorinated monomers (B) with end group Y being in admixture with fluorinated monomers containing sulphonyl groups —$SO_2F$, the total amount of monomers (B) being such to give the equivalent weight as above indicated.

7. The method of claim 1, wherein the sulphonic fluorinated jonomers contain from 0.01% to 2% by moles of monomeric units deriving from a bis-olefin of formula:

$$R_1R_2C=CH-(CF_2)_m-CH=CR_5R_6 \qquad (I)$$

wherein:
m=2-10;
$R_1, R_2, R_5, R_6$, equal to or different from each other, are H or $C_{01}$-$C_{05}$ alkyl groups.

8. The method of claim 1, wherein the amorphous (per)fluorinated ionomers are in admixture with crosslinking agents and then crosslinked.

9. The method of claim 8, wherein the ionomer comprises monomeric units deriving from TFE;
monomeric units deriving from $CF_2=CF-O-CF_2CF_2SO_2F$;
monomeric units deriving from the bis-olefin of formula (I);
iodine atoms in terminal position.

10. The method of claim 8, wherein to the ionomer mixture with the crosslinking agents the following components are optionally added:
a crosslinking co-agent, in an amount between 0.5 and 100% by weight with respect to the polymer;
a metal compound, in amounts between to 1% and 15% by weight with respect to the polymer, said metal compound selected from divalent metal oxides or hydroxides optionally combined with a weak acid salt;
thickening additives, pigments, antioxidants, stabilizers;
inorganic or polymeric reinforcing fillers; said fillers having a particle size from 10 to 100 nm.

11. The method of claim 10, wherein said metal compound comprises at least one of Mg, Zn, Ca and Pb.

12. The method of claim 10, wherein said weak acid salt are selected from the group consisting of: Ba, Na, K. Pb, and Ca stearates, benzoates, carbonates, oxalates or phosphites.

13. The method of claim 10, wherein said filler comprises fibrillable PTFE.

14. The method of claim 8, wherein the ionomer is mixed with fluoroelastomers that are co-curable with the ionomer.

15. The method of claim 14, wherein the fluoroelastomers comprise iodine and/or bromine atoms.

16. The method of claim 1, wherein the ionomer is mixed with a fluoropolymer selected from the following: crystalline fluoropolymers, optionally modified with a comonomer selected from HFP (hexafluoropropene), VE (vinylethers).

17. The method of claim 1, wherein the membranes, before the conversion of the functional precursor groups to the acid groups, are reinforced by adhering by hot lamination to a reinforcement net.

18. The method of claim 17, wherein the membranes are reinforced with TFE nets.

19. The method of claim 1, comprising ionomers having MFI values measured at 280° C. and 10 Kg (ASTM D 1238-52T), equal to or lower than 0.6 g/10 mm.

20. The method of claim 1, wherein the electrodes have 10 $cm^2$ area and are formed of a carbon cloth having a thickness of 350 μm and weight for surface unit of 116 $g/cm^2$, said carbon cloth being treated on one side as described hereinafter:

a first treatment is carried out with a PTFE/carbon mixture so as to make the sheet surface hydrophobic;
subsequently, one side of the surface is catalyzed with Pt supported on carbon powder having a surface area of 250 $m^2/g$, the Pt concentration being 30% by weight with respect to the carbon powder and the Pt surface concentration being 0.6 $mg/cm^2$;
the catalyzed side is treated with the ionomeric polymer having equivalent weight 1,100 eq/g and having the following structure:

$$-(CF_2-CF_2)_{a''}-(CF-O-CF_2-CFO-CF_2CF_2SO_3H)_{b''}-$$
$$\phantom{-(CF_2-CF_2)_{a''}-(}|\phantom{CF-O-CF_2-C}|$$
$$\phantom{-(CF_2-CF_2)_{a''}-(}CH_2\phantom{-O-CF_2-}CF_3$$

a' and b' being such to give the required equivalent weight;
so as to have a surface concentration of said polymer of 0.7 $g/cm^2$.

21. The method of claim 1, wherein the polymers have an EW of from 450 to 1,650 g/eq.

22. A method of using a membrane in electrolyzers for HCI, comprising the step of providing an ionomeric membrane made of (per) fluorinated, semicrystalline or amorphous, ionomeric polymers, having equivalent weight (EW) from 380 g/eq to 1,800 g/eq, when used in a fuel cell under the following conditions:

50 μm membrane thickness assembled between two electrodes catalyzed with 0.6 $mg/cm^2$ Pt supported on Carbon (Pt/C) and treated with 0.7 $mg/cm^2$ of perfluorinated polymer, having 10 $cm^2$ area; hydrogen and air feeding, both at the pressure of 0.25 MPa, both saturated with water at 80° C.; cell temperature 75° C.;
and is formed of copolymers of $TFE/F_2C=CF-O-(CF_2)_2-SO_2F$, gives the following maximum specific power values ($P_{MAX}$), at the indicated EW values:

| | |
|---|---|
| EW = 670 | $P_{MAX}$ higher than 0.55 Watt/$cm^2$; |
| EW = 830 | $P_{MAX}$ higher than 0.66 Watt/$cm^2$; |
| EW = 1,160 | $P_{MAX}$ higher than 0.50 Watt/$cm^2$; |
| EW = 1,600 | $P_{MAX}$ higher than 0.32 Watt/$cm^2$. |

23. A method of using a membrane in electrolyzers for a chloro/soda process, comprising the step of providing an ionomeric membrane made of (per)fluorinated, semicrystalline or amorphous, ionomeric polymers, having equivalent weight (EW) from 380 g/eq to 1,800 g/eq, when used in a fuel cell under the following conditions:

50 μm membrane thickness assembled between two electrodes catalyzed with 0.6 $mg/cm^2$ Pt supported on Carbon (Pt/C) and treated with 0.7 $mg/cm^2$ of perfluorinated polymer, having 10$cm^2$ area; hydrogen and air feeding, both at the pressure of 0.25 MPa, both saturated with water at 80° C.; cell temperature 75° C.;

and is formed of copolymers of TFE/$F_2C=CF-O-(CF_2)_2-SO_2F$, gives the following maximum specific power values ($P_{MAX}$), at the indicated EW values:

EW = 670    $P_{MAX}$ higher than 0.55 Watt/cm$^2$;
EW = 830    $P_{MAX}$ higher than 0.66 Watt/cm$^2$;

-continued

EW = 1,160    $P_{MAX}$ higher than 0.50 Watt/cm$^2$;
EW = 1,600    $P_{MAX}$ higher than 0.32 Watt/cm$^2$.

* * * * *